Patented May 12, 1936

2,040,812

UNITED STATES PATENT OFFICE 2,040,812

SYNTHETIC RESIN FOR VARNISHES

Arthur J. Norton and Frank W. Less, North Tonawanda, N. Y., assignors to General Plastics, Inc., North Tonawanda, N. Y.

No Drawing. Application March 16, 1933, Serial No. 661,182

17 Claims. (Cl. 260—2)

This invention relates to artificial resins and more particularly to resins compatible with drying oils for the production of varnishes and the like.

Attempts have been made heretofore to produce artificial resins from certain essential oils by reacting such materials with formaldehyde, or certain of its chemical derivatives, but without any marked success. So also, attempts have been made to prepare resins by the treatment of terpene hydrocarbons with phenol. To date no particular use has been made of such resins and they have received no marked commercial or public acclaim.

The present invention provides a method of preparing artificial resinous materials by the interaction of phenols and oxyterpene derivatives with the production of artificial resins possessing advantageous commercial properties since such resins are directly compatible with petroleum spirits and also with the usual commercially used drying oils.

To carry out the invention the oxyterpene, such as terpineol, menthol, menthone, and the like, is caused to interact with a phenol in the presence of a condensing agent such as concentrated sulphuric acid, or other suitable agent. The reaction is normally caused to occur between substantially equimolecular quantities of the reactants with about 5% sulphuric acid calculated upon the quantity of the phenol used. Normally, the phenol and acid are mixed together and heated to a temperature in the neighborhood of 150° C., and the oxyterpene added slowly and with stirring in order to prevent too great disturbance in the reaction chamber, and to insure good reaction between the phenol and the oxyterpene and to decrease probable volatilization of the latter as the oxyterpenes are normally liquids at room temperature or readily liquefiable. After the oxyterpene has been added to the reaction mixture of catalyst and phenol, the mixture is distilled under vacuum until a brittle resin is obtained.

As an example of a specific method of procedure the following is illustrative, 100 parts of U. S. P. phenol are mixed with five parts of sulphuric acid and the mixture heated to 150° C. To this mixture is added about 155 parts of alpha terpineol, that is, approximately equimolecular proportions of the phenol and the oxyterpene are used although considerable deviation from such proportions may be had without affecting the quality of the final resin. The addition of the terpineol should be made while the temperature of the mixture is somewhat below the boiling point of the oxyterpene, and at a temperature sufficiently high to induce chemical reaction between the phenol and the oxyterpene with subsequent resin formation. After the addition of the oxyterpene has been completed, the mixture is subjected to distillation in the well known fashion, as for instance distillation in vacuo until a brittle resin is produced which can be purified by the usual washing and purifying operations. We have found, additionally, that a resin may be produced from crude or technical products containing oxyterpenes, and have produced a good grade of resin by causing interaction between the phenol and pine oil in the presence of a catalyst or condensing agent and under suitable conditions. That is, pine oil containing fractions boiling between about 175 and 225° C., and which comprises about 75% terpineol is treated with phenol. In order to effect resin formation, the phenol and sulphuric acid are heated, as above indicated, and the pine oil added slowly thereto without agitation to effect reaction between the phenol and the constituents of the pine oil, and to prevent large fluctuations in temperature in the bath and also to prevent undue loss by volatilization of the added oil. Upon the complete addition of the oil, about 175 parts of oil being added per each hundred parts of phenol, the mass is subjected to distillation as before, which distillation is continued until a brittle resin is produced. The resin is subsequently washed and soluble impurities removed.

Another example illustrative of the adaptability of the method is the production of a resin of our improved type from cresol, such as meta cresol and terpineol.

100 parts of cresol are treated with
  5 parts of phosphoric acid and the mass heated to 150° C., whereupon
150 parts of the terpineol are added slowly with stirring and the heating continued until all the terpineol has been added.
  The mass is then distilled in the usual way until a brittle resin remains.

Other phenols can be used in the preparation of our resin, as for instance the xylenols, about 135 parts of terpineol being reacted with 100 parts of the xylenol in the presence of a catalyst.

Resins which are produced by the processes of this invention comprise phenolic oil soluble and oil reactive resins of unusual lightness of color, freedom from odor, quickness or drying and ease of kettle procedure. The resin is soluble at room temperature in all common solvents including mineral spirit, soluble in drying oils such as China wood oil, linseed oil, menhaden oil, perilla oil, soya bean oil and the like. The resin has a melting point in the neighborhood of 150° F., and acid number of 0.56 (neutral) and a color which corresponds to a W W rosin in toluol solution, the solid resin having a very light brown cast.

In order to incorporate the resin in a drying oil, as for instance, China wood oil, the China wood oil is heated with about 60% of the total resin in the varnish formulation to about 535° F., whereupon the heat is cut and the temperature checked with the remaining 40% of the resin in the varnish. The temperature is then held at approximately 500° F., for body, the drier added, and the mass cooled and reduced. This combination of gum and oil is soluble in petroleum and the usual varnish driers may be used. This resin can be cooked directly with linseed oil and will give a comparatively rapid drying film of light and improved durability. There is a lack of skinning and an excellent adhesion of the resulting film. The resin is especially useful for the production of air drying varnishes and enamels. Its rapid drying makes it ideal for 4 hour varnishes, in which period the film dries throughout and not merely upon the surface. When properly formulated, the varnish dries from the inside out with good adhesion and a solid, uniform film results. This film possesses resistance to water, alkalis and acids in excess of the films produced from ordinary varnishes. The light color of this phenolic resin permits its use for light colored enamels, heretofore considered impossible with phenolic resins and no after yellowing results.

The following examples are illustrative of the uses of our improved resin and are included merely to exemplify the processes and should in no wise be considered as the only uses of the improved resin.

*40 gal. resin varnish-air dry*

60 grams resin
312 grams China wood oil
Heat to 534° F., cut the heat and add
40 grams resin
Hold cook at 500° F., for body and add
1.56 grams cobalt linoleate (8.5%)
Cool to 420° F., and add
350 grams mineral spirits.

*20 gal. resin varnish-air dry*

60 grams resin
156 grams China wood oil
Heat to 535° F., cut the heat and add
40 grams resin
Hold cook at 500° F., for body and add
0.78 grams cobalt linoleate (8.5%)
Cool to 420° F., and add
170 grams varnolene (mineral spirits)

*40 gal. resin varnish-baking*

60 grams resin
250 grams China wood oil
62 grams heavy kettle bodied linseed oil
Heat to 535° F., check with
40 grams resin
Hold cook at 500° F., for body and add
0.78 grams cobalt linoleate (solid 8.5%)
Cool to 420° F., and reduce with
350 grams mineral spirits

*20 gal. resin varnish-baking*

60 grams resin
125 grams China wood oil
31 grams heavy kettle bodied linseed oil
Heat to 535° F., and check with
40 grams resin
Hold cook at 500° F., for body and add
0.39 grams cobalt linoleate (solid 8.5)
Cool to 420° F. and add
256 grams mineral spirits

What is claimed is:

1. The method of preparing an artificial resin from the components, terpineol and a phenol which consists in causing the terpineol and the phenol to react in the presence of a condensing agent.

2. The method of preparing an artificial resin from the components terpineol and phenol which consists in condensing the terpineol and the phenol in resinifying proportions at a temperature below the boiling point of the terpineol.

3. The method of preparing an artificial resin from pine oil and a phenol which consists in causing the pine oil and the phenol to react in resinifying proportions in the presence of a condensing agent.

4. The method of preparing an artificial resin from pine oil and phenol which consists in condensing the pine oil and phenol in resinifying proportions.

5. The method of preparing an artificial resin from pine oil and cresol which consists in condensing the pine oil and cresol in resinifying proportions.

6. The method of preparing an artificial resin from terpineol and cresol which consists in condensing the terpineol and cresol in resinifying proportions.

7. The method of preparing an artificial resin from a phenol and a material selected from the group consisting of terpineol, menthol and menthone, which consists in condensing the phenol and material in resinifying proportions.

8. The method of preparing an artificial resin from phenol and a material selected from the group consisting of terpineol, menthol and menthone, which consists in condensing the phenol and material in resinifying proportions.

9. The method of preparing an artificial resin from cresol and a material selected from the group consisting of terpineol, menthol and menthone, which consists in condensing the cresol and material in resinifying proportions.

10. A resin consisting of the reaction product of terpineol and a phenol.

11. A resin consisting of the reaction product of terpineol and phenol.

12. A resin consisting of the reaction product of terpineol and cresol.

13. A resin consisting of the reaction product of pine oil and a phenol.

14. A resin consisting of the reaction product of pine oil and phenol.

15. A resin consisting of the reaction product of pine oil and cresol.

16. The method of preparing an artificial resin which comprises heating a mixture in which the reaction ingredients consist essentially of terpineol and a phenol in resinifying proportions in the presence of a condensing agent and continuing the heating until a resin is formed.

17. The method of preparing an artificial resin which comprises heating a mixture in which the reaction ingredients consist essentially of terpineol and a phenol in resinifying proportions in the presence of an acid condensing agent and continuing the heating until a resin is formed.

ARTHUR J. NORTON.
FRANK W. LESS.

CERTIFICATE OF CORRECTION.

Patent No. 2,040,812.                                                May 12, 1936.

ARTHUR J. NORTON, ET AL.

It is hereby certified that error appears in the printed specification of the above numbered patent requiring correction as follows: Page 2, first column, line 38, for "534°" read 535° ; and second column, line 56-57, claim 16, for "rein" read resin; and that the said Letters Patent should be read with these corrections therein that the same may conform to the record of the case in the Patent Office.

Signed and sealed this 21st day of July, A. D. 1936.

Henry Van Arsdale (Seal)                                          Acting Commissioner of Patents.